United States Patent
Dukart et al.

(10) Patent No.: US 6,832,881 B2
(45) Date of Patent: Dec. 21, 2004

(54) CONNECTING ELEMENT

(75) Inventors: Anton Dukart, Gerlingen (DE); Klaus Marx, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/275,218

(22) PCT Filed: Feb. 26, 2002

(86) PCT No.: PCT/DE02/00699
§ 371 (c)(1),
(2), (4) Date: Mar. 4, 2003

(87) PCT Pub. No.: WO02/070906
PCT Pub. Date: Sep. 12, 2002

(65) Prior Publication Data
US 2003/0156920 A1 Aug. 21, 2003

(30) Foreign Application Priority Data
Mar. 7, 2001 (DE) .......................................... 100 11 020

(51) Int. Cl.[7] ................................................ F16B 31/02
(52) U.S. Cl. ..................... 411/14; 73/761; 116/DIG. 34
(58) Field of Search ............................. 411/10, 11, 14; 73/761; 116/DIG. 34; 296/65.01

(56) References Cited

U.S. PATENT DOCUMENTS

| | | | | |
|---|---|---|---|---|
| 5,392,654 A | * | 2/1995 | Boyle | ........................ 411/14 X |
| 5,584,627 A | * | 12/1996 | Ceney et al. | .................. 411/14 |
| 5,628,601 A | | 5/1997 | Pope | |
| 6,250,863 B1 | * | 6/2001 | Kamentser et al. | ........... 411/10 |

FOREIGN PATENT DOCUMENTS

EP          0 787 980 A          8/1997

* cited by examiner

Primary Examiner—Neill Wilson
(74) Attorney, Agent, or Firm—Michael J. Striker

(57) ABSTRACT

The invention proposes a connecting element (5) with an elongated shaft (19), in particular a screw or bolt, for connecting two bodies, wherein at least part of the shaft (19) has a slot (14) and a recess (13). The invention also proposes that a component (10) that generates a magnetic field, and spaced apart from it, a magnetically sensitive element (11) be disposed in the vicinity of the recess (13). The proposed connecting element is particularly suitable for detecting a force or mechanical strain acting on the seat of a motor vehicle.

12 Claims, 1 Drawing Sheet

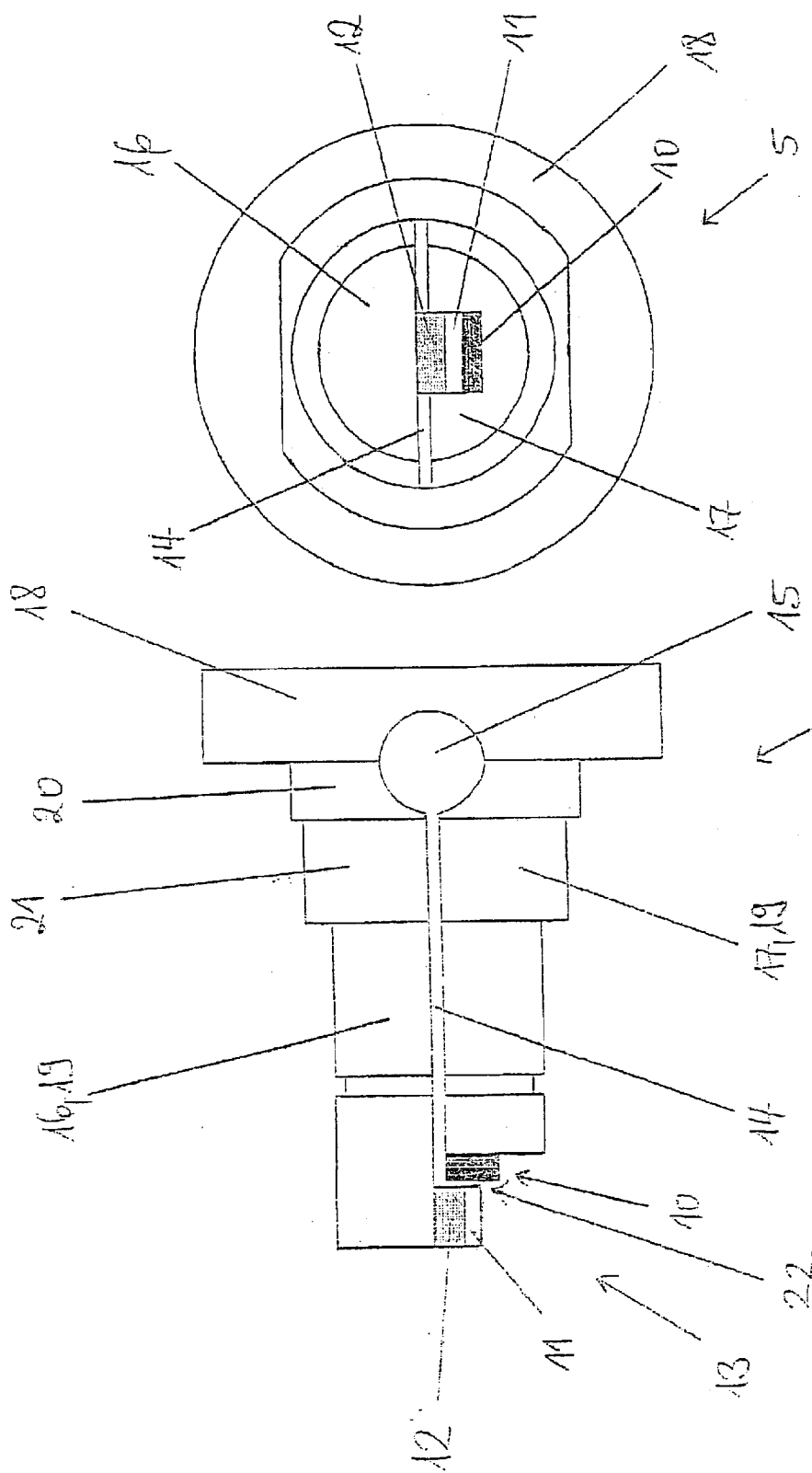

CONNECTING ELEMENT

BACKGROUND OF THE INVENTION

The invention relates to a connecting element, in particular a screw or a bolt, for connecting two bodies.

For electronic systems in motor vehicles, at connecting points between two components or bodies in which a force is concentrated, there is increasing demand for a small and compactly designed force sensor that can be produced inexpensively and in mass quantities. This is particularly true for the measurement of the weight acting on the seat of a motor vehicle and the weight distribution or changes in the weight as a function of time. There is also an increasing demand for precise, statically measuring force sensors in production measuring methods and quality measuring methods.

Small, known sensors are mostly based on the piezoelectric converter principle and can therefore only be operated dynamically. By contrast, static force sensors are frequently embodied as bending springs, which, equipped with strain gauges, do in fact produce very precise force sensors, but they are relatively large in size and are comparatively expensive.

In addition, magnetoelastic sensors are known, which are either based on the Kreuzduktor principle, which is particularly suitable for applications, which must function without electronics on site due to high temperatures or in which there is only a small amount of space available, or which are based on the Torduktor principle, in which two U-shaped cores, which are rotated in relation to each other by 90° and wound with coils, detect the magnetic field distribution in a contactless, force-dependent manner.

The Kreuzduktor principle has the disadvantage that it only supplies low useful voltages, which are more often than not encumbered with a large offset and can therefore only be evaluated with difficulty. In addition, they can only be used at a high additional cost when there are moving or rotating parts. The Torduktor principle does permit force measurements to be executed on rotating parts as well, but is very distance-sensitive.

The object of the invention was to produce a small, compactly designed force sensor in the form of a connecting element, which permits in particular a reliable seat weight sensing in the seat of a motor vehicle. In this connection, the force sensor should not increase the seat height and should produce a fixed stop in the event of an overload.

SUMMARY OF THE INVENTION

The connecting element according to the invention has the advantage over the prior art that it can be easily adapted to different measurement ranges by means of different cross sectional diameters of the inserted shaft and the geometry and dimensions of the slot let into the shaft.

The connecting element according to the invention can also be embodied as very small and compactly designed and it uses a static measuring principle. In this respect, it can be universally used to measure the connecting forces between two parts.

An additional advantage of the connecting element according to the invention lies in the fact that the magnetic field generated can be picked up in a force-proportional and contactless manner in the air gap produced by the slot and by means of the magnetically sensitive element disposed in the vicinity of this air gap. In this connection, it is particularly advantageous that even a slight change of the form or width of the slot due to the action of an external force or a mechanical strain at the location of the magnetically sensitive element by means of the component that produces the magnetic field causes an intense change in flux density. As a result, even slight changes in the form of the slot produce a powerful measurement signal.

In the connecting element according to the invention, it is also advantageous that the magnetically sensitive element can be fully integrated with an associated set of evaluation electronics in it, which permits a simple supply and a compact, extremely inexpensive construction.

Another advantage of the connecting element according to the invention, particularly in its embodiment as a force measuring screw or force measuring bolt on the seat of a motor vehicle, is the possibility of also executing a belt force sensing, for example at the point at which it is anchored to the seat of the motor vehicle.

It is particularly advantageous if an intrinsically known Hall sensor element is used as the magnetically sensitive element, whose primary advantage is its favorable zero point stability.

On the other hand, in the case of the magnetic measuring method used, it is advantageous that the magnetically sensitive element is disposed in the magnetic zero point and therefore also a possible aging of the magnetic circuit or of the component that generates the magnetic field does not contribute to the offset of the Hall sensor element.

Through the additional provision of conventional strain gauges, it is also possible in a simple manner to differentiate between a tensile strain acting on the connecting.
Drawings The invention will be explained in detail in conjunction with the drawings and in the subsequent description.

BRIEF DESCRIPTION OF THE DRAWINGS

FIG. 1 shows a section through an exemplary embodiment of a connecting element in the form of a screw, FIG. 2 shows a horizontal projection of FIG. 1, viewed from the shaft of the connecting element.

DESCRIPTION OF THE PREFERRED EMBODIMENTS

FIG. 1 shows a connecting element 5 in the form of a screw or bolt, with a head 18 and a shaft or threaded bolt 19 connected to it, particularly one that is at least partially threaded, where in the vicinity of the transition from the head 18 to the shaft 19, a circumferential collar 20 and a flattened, circumferential collar 21 are also provided. In a horizontal projection of the head 18 and the shaft 19, these are embodied as cylindrically symmetrical, i.e. the base is circular, as shown in FIG. 2.

In FIG. 1, the shaft 19 is also provided with a slot 14, which extends along the longitudinal axis of the shaft 19 and, with the exception of a recess 13 explained further below, divides it into two symmetrically embodied parts, a first part and a second part 17.

FIG. 1 also shows that in the vicinity of the transition from the head 18 to the shaft 19, a straight bore 15 connected to the slot 14 is let into the connecting element 5 and extends perpendicular to the longitudinal axis of the shaft 19. In many cases, this bore 15 is advantageous in terms of an increased measurement precision, but can also be omitted if necessary.

On the whole, the slot 14 and the bore 15 divide the connecting element 5, with the exception of the recess 13, into two equivalent parts 16, 17, which are connected to each other by means of the head 18. In this respect, the connecting element 5 is also understood to be a measuring spring.

FIG. 1 also shows that the second part 17 has the recess 13 at its end oriented away from the head 18. After the production of the slit 14, this recess was produced by sawing into the second part 17 perpendicular to the direction of the slot 14 so that the second part 17 is recessed in relation to the first part 16 by the height of the recess 13. In the horizontal projection, the part removed during production of the recess 13 has the form of a half-moon.

In addition, the top of the end of the second part 17 oriented away from the head 18 has a component 10 attached to it, which generates a magnetic field and which in actuality is a platelike permanent magnet connected to the shaft 19 or to the second part 17 of the shaft 19. In addition, in the vicinity of the recess 13, a support 12 is disposed on the first part 16 of the shaft 19 and a magnetically sensitive element 11 is disposed on this support so that the magnetically sensitive element 11 and the component 10 that generates the magnetic field are spaced apart from each other by a narrow air gap 22 of for example 0.3 mm. For example, the magnetically sensitive element 11 is a conventional Hall sensor element, which is preferably designed and disposed so that it is disposed in the magnetic zero point of the component 10 when the connecting element 5 is not under strain and therefore has a stable offset.

FIGS. 1 and 2 show other details of the design of the connecting element 5. It should be noted in this connection that the connecting element 5, which according to FIGS. 1 and 2 can be embodied as a screw with a threaded bolt, which can be provided with a suitable nut if necessary, can also be embodied as a bolt, in particular a socket pin without a head, or as a rivet, in order to connect two bodies.

For example, the total length of the connecting element 5 is 10 mm to 30 mm, the diameter of the shaft 19 is 4 mm to 12 mm, the diameter of the circumferential collar 20 is 6 mm to 16 mm, with a height of 2 mm to 6 mm, the diameter of the flattened circumferential collar is 8 mm to 20 mm, with a height of 2 mm to 6 mm, the diameter of the head 18 is 12 mm to 30 mm, with a height of 2 mm to 6 mm, the diameter of the bore 15 is 2 mm to 6 mm, the height of the slot 14 is 0.2 mm to 1 mm, in particular 0.5 mm, the width of the air gap 22 is 0.1 mm to 0.8 mm, in particular 0.3 mm, the thickness of the platelike permanent magnet 10 is 0.5 mm to 1.5 mm, and the height of the support 12 is 0.5 mm to 2 mm. Preferably, the height of the support 12 is selected so that the Hall sensor element 11, when viewed in the horizontal projection according to FIG. 2, is disposed symmetrically or centered in relation to the permanent magnet 10.

The connecting element 5 according to FIGS. 1 and 2 is particularly suited for fastening a seat of a motor vehicle to a slide rail connected to the vehicle body, in which the connecting element simultaneously also serves as a force sensor for measuring the weight acting on the seat. As a rule, the seat is provided with four fastening screws or connecting elements 5, and the force acting on the seat is measured at each of them.

The measuring principal of the connecting element 5 is based on the fact that a force or mechanical strain acting on the connecting element 5 and the two parts 16, 17 of the shaft 19 divided by the slot 14 produces a change in the geometry of the slot 14 and simultaneously produces an induced mechanical strain in the head. This change in the geometry of the slot 14 is then detected by means of the magnet 10 and the Hall sensor element 11 due to the change in the air gap 22 between the two of them.

Since the connecting element 5, which is described above and used as a force measuring bolt, has a V-shaped characteristic curve as a function of the weight acting on it, it is therefore as a rule difficult to differentiate between a positive weight and a negative weight if this differentiation is required during operation.

In order for the connecting element 5 also to be able to reliably differentiate between a positive weight and a negative weight and in order to produce a connecting element 5 that only detects a positive weight, the invention uses the fact that in the region of a negative weight, i.e. in the second quadrant of the characteristic curve, the strain produced by it in the connecting element 5 is slightly asymmetrical. This asymmetry is produced by the axially distributed introduction of force onto the connecting element 5 and can be detected by means of an additionally provided strain gauge or an arrangement of differential strain gauges, for example applied using thin film technology.

Therefore a preferred embodiment of the connecting element 5 includes the provision that at least one strain gauge that is not shown is additionally integrated into or attached to the connecting element 5 in certain regions, for example on the top of the head 18 oriented away from the shaft 19, which can also detect a force or mechanical strain acting on the connecting element 5. Strain gauges or arrangements of differential strain gauges of this kind, for example applied using thin film technology, with associated evaluation electronics, are known from the prior art.

Alternatively to providing additional strain gauges, the connecting element 5 according to the invention can also be embodied to be sensitive to the direction of the exerted weight by virtue of the fact that two parts 16, 17 are suitably anchored to the parts of the body that introduce the force into them and that are joined together by the connecting element 5.

What is claimed is:

1. A connecting element, in particular a screw or bolt, with an elongated shaft (19), characterized in that at least part of the shaft (19) has a slot (14) and a recess (13), wherein a component (10) that generates a magnetic field and spaced apart from it, a magnetically sensitive element (11) are disposed in the vicinity of the recess (13).

2. The connecting element according to claim 1, characterized in that the component (10) that generates the magnetic field and the magnetically sensitive element (11) are disposed in such a way that a force or mechanical strain acting on the connecting element (5) produces a change in a signal of the magnetically sensitive element (11) caused by the component (10).

3. The connecting element according to claim 1, characterized in that the slot (14) extends along the longitudinal axis of the shaft (19) and, with the exception of the recess (13), divides the shaft into two symmetrically embodied parts (16, 17).

4. The connecting element according to claim 1, characterized in that the shaft (19) is connected to a head (18).

5. The connecting element according to claim 1, characterized in that the recess (13) is let into the shaft (19) at the end of the shaft (19) oriented away from the head (18).

6. The connecting element according to claim 1, characterized in that the recess (13) and the slot (14) are let into the shaft (19) in such a way that the shaft (19) is divided into a first part (16) and a second part (17), which are separated from each other by the slot (14), and wherein one of the two parts (16, 17) has the recess (13) at its end oriented away from the head (18).

7. The connecting element according to claim 1, characterized In that one of the two parts (16,17) of the shaft (19)

is connected to the component (10) that generates the magnetic field and the other part (16, 17) is connected to the magnetically sensitive element (11).

8. The connecting element according to claim 1, characterized in that in particular, the component (10) that generates the magnetic field is a platelike permanent magnet connected to the shaft (19).

9. The connecting element according to claim 1, characterized in that the magnetically sensitive element (11) is a Hall sensor element, which is connected to the shaft (19) and is in particular disposed on a support (12).

10. The connecting element according to claim 1, characterized in that in the vicinity of the connection of the shaft (19) to the head (18), a bore (15) is let into the head (18) and/or into the shaft (19) and is connected to the slot (14).

11. The connecting element according to claim 1, characterized in that functioning as an imaginary plane of symmetry, the slot (14) divides the connecting element (5), with the exception of the (13), into two equal parts (16, 17) that are connected to each other by means of the head (18).

12. connecting element according to claim 1, characterized in that it is embodied as the screw or bolt for connecting two bodies.

* * * * *